US005743089A

United States Patent [19]

Tohji

[11] Patent Number: 5,743,089

[45] Date of Patent: Apr. 28, 1998

[54] HYDRAULIC CONTROL SYSTEM

[75] Inventor: Yutaka Tohji, Hiroshima, Japan

[73] Assignee: Kabushiki Kaisha Kobe Seiko Sho, Kobe, Japan

[21] Appl. No.: 686,704

[22] Filed: Jul. 25, 1996

[51] Int. Cl.[6] .......... F16D 31/02

[52] U.S. Cl. .......... 60/450; 60/452

[58] Field of Search .......... 60/450, 452

[56] References Cited

U.S. PATENT DOCUMENTS

| | | | |
|---|---|---|---|
| 4,976,106 | 12/1990 | Noerskau et al. | 60/452 |
| 5,394,697 | 3/1995 | Hirata | 60/452 |
| 5,398,507 | 3/1995 | Akiyama et al. | 60/452 |
| 5,533,867 | 7/1996 | Strenzke | 60/450 |

FOREIGN PATENT DOCUMENTS

| | | | |
|---|---|---|---|
| 59003 | 5/1981 | Japan | 60/452 |

*Primary Examiner*—F. Daniel Lopez

*Attorney, Agent, or Firm*—Oblon, Spivak, McClelland, Maier & Neustadt, P.C.

[57] ABSTRACT

A control valve is provided in a line between a variable displacement hydraulic pump and a hydraulic cylinder. The control valve controls flow rate of working fluid supplied to the hydraulic cylinder according to a manipulated variable of a lever. The control increases a discharge of the hydraulic pump in association with the increase in the manipulated variable and also controls to suppress the discharge as the discharge pressure of the hydraulic pump increases. A proper response corresponding to the operator's feeling can be realized in consideration of an actual pressure loaded on an actuator on the basis of a positive control system.

8 Claims, 9 Drawing Sheets

HYDRAULIC CONTROL SYSTEM

BACKGROUND OF THE INVENTION

1. Field of the Invention

The present invention relates to a hydraulic control system. More particularly, the invention relates to a hydraulic control system for controlling flow rate of a working fluid supplied from a hydraulic pump to a hydraulic actuator according to a manipulated variable applied to a control element and for controlling also discharge of the hydraulic pump.

2. Description of the Related Art

In a circuit including a control valve provided in a line between a variable displacement hydraulic pump and a hydraulic actuator in order to control supply flow rate of a working fluid to the hydraulic actuator according to a manipulated variable given to a lever, discharge of the hydraulic pump is also controlled for an object of an energy-saving operation or the like. The following discharge control systems are known.

A) Negative control system

A restrictor is provided in a path from a center by-pass of the control valve to a tank and a flow of a return fluid is measured on the basis of a back pressure of the restrictor. When the back pressure is low, that is, when the flow of the return fluid is small and the flow rate of the working fluid supplied to the hydraulic actuator is large, the discharge of the hydraulic pump is increased. When the back pressure is high, that is, when the flow of the return fluid is large and the flow rate of the working fluid supplied to the hydraulic actuator is small, the discharge of the hydraulic pump is decreased (refer to, for example, JP-B-48-36874).

According to such a control system, when the requested flow of the working fluid to the hydraulic actuator is small, the displacement of the pump is suppressed and only when the requested flow of the working fluid is large, the displacement of the pump is increased, thereby realizing the energy-saving operation. Since the requested flow of the working fluid is measured on the basis of the back pressure of the restrictor in the return path, even the control valve and the hydraulic pump mismatch due to a variation in performances of the control valve and the hydraulic pump, the mismatch can he compensated. Even if the lever is suddenly operated, a relatively slow response of the pump discharge corresponding to the lever operation prevents the sudden operation of the hydraulic actuator. Therefore, such a control system is especially suitable for an operation by an operator having little experience, an inching, or the like.

B) Lead sensing control system

A differential pressure between before and after pressures of a spool in the control valve is detected and the pump discharge is feedback controlled so as to always keep the differential pressure to be constant, thereby attempting the energy-saving operation during the operation of the actuator. JP-B-3-33926 discloses a technique such that a circuit pressure is maintained to a certain extent in a state where the control valve is in a neutral position, thereby enabling the actuator to be quickly started up at the time of the activation.

C) Positive control system

A secondary pressure of a remote-control valve (hereinlater, referred to as a "remote-control pressure") for controlling the control valve is sent to the regulator of the hydraulic pump. When the remote-control pressure is large, that is, when the lever is operated through a large stroke and the supply flow rate of the working fluid through the control valve is large, the displacement of the pump is increased. On the contrary, when the lever is operated through a small stroke and the supply flow rate of the working fluid is small, the displacement of the pump is decreased. The positive control system has the advantages that the pump response is faithful to the manipulated variable of the lever directly connected to the requested flow rate of the working fluid can be performed and that the product is cheap.

Further, in the positive control system, a system in which an electrical control system is assembled; that is; a system in which the remote-control pressure is not directly supplied to the pump regulator, but a detection signal of the remote-control pressure is supplied to a controller, the pump discharge is electrically controlled by an output signal from the controller is known. In such a system, the relation between a remote-control pressure Pi and a pump discharge Q as shown by the following expressions and in FIG. 9 is applied.

(1) when $0 \leqq Pi < Pia$, $Q = Qmin$ (constant)

(2) when $Pia \leqq Pi \leqq Pib$ $$Q = Qmin + \frac{Qmax - Qmin}{Pib - Pia} \times (Pi - Pia)$$

(3) when $Pi > Pib$ $Q = Qmax$ (constant)

According to the relation, the pump discharge Q is maintained to the minimum discharge (stand-by discharge) Qmin irrespective of the remote-control pressure Pi until the remote-control pressure Pi reaches a predetermined threshold Pia. The pump discharge Q is increased in proportional to an increase amount of the remote-control pressure Pi in an area where the remote-control pressure Pi lies within a range from the threshold Pia to a predetermined level- off value Pib (>Pia). The pump discharge Q is held to a maximum flow Qmax irrespective of the remote-control pressure Pi in an area where the remote-control pressure Pi is equal to or larger than the level-off value Pib. According to such a control system, since the pump discharge Q is maintained to the stand-by discharge Qmin while the remote-control pressure Pi is extremely low, it is prevented that the hydraulic actuator reacts to a slight quiver of the lever and operates.

The control systems have, however, the following subjects to be solved, respectively.

A) Negative control system

Since the center by-pass flow is largely influenced by the magnitude of the pressure loaded on the actuator, a variation in the pump discharge corresponding to the constant lever manipulated variable is large and the operation is not easy to be stabilized. When the lever is suddenly operated, a bypass flow is increased by the activation pressure (surge). As a result, since the supply flow rate to the actuator side decreases, there is a trouble such that a response especially in a sand spreading work, mud dropping work, a slope tamping work, and the like deteriorates. Further, a restrictor has to be provided in the return oil line to perform the control and the passing sound of the working fluid at the restrictor grates on the ears of the operator.

B) Load sensing control system

In order to perform the control, each actuator needs a pressure compensation valve. What is more, since it is necessary to strictly control the variation in the performance, it is feared that the whole system is expensive.

C) Positive control system

In the control system, the displacement of the pump is changed faithfully to the manipulated variable of the lever irrespective of the pressure loaded on the actuator. Even when the lever is slightly erroneously operated, it is feared that the displacement of the pump sensitively reacts to the erroneous operation and the machine unexpectedly moves or swings. There is a drawback such that the operation is difficult for especially the operator having little experience. Generally, many operators feel that "the response of the actuator is slower when the pressure loaded is large as compared with that when the pressure loaded is small, so that the lever has to be operated through a larger stroke". If the lever is suddenly operated according to such a feeling when the actuator is highly loaded, the sudden increase of the displacement of the pump in response to the operation can cause unexpected abnormal rise of the pump discharge pressure. Since the pressure loaded on the actuator is not taken into the control, the mismatch of the pump and the valve due to a variation in the pump performance and the valve performance cannot be compensated. When a quality control is neglected, consequently, there is the possibility such that an excessive discharge pressure of the pump is generated due to the mismatch and a force that causes a spool to flow is generated due to the excessive discharge pressure of the pump.

It can be considered that a restrictor is provided in the hydraulic signal line or a filter is provided in the electric control system as means for solving the oversensitiveness mentioned above. Even in this case, the response corresponding to the feeling of the operator cannot be given according to the load of the actuator. There is also the possibility such that an excessive discharge pressure of the pump is newly generated when the restrictor or the like is disposed.

SUMMARY OF THE INVENTION

It is an object of the invention to provide a hydraulic control system which can realize a proper response corresponding to a feeling of an operator in consideration of an actual pressure loaded on an actuator.

The hydraulic control system of the invention has a variable displacement hydraulic pump, a hydraulic actuator, and a control valve which is provided between the hydraulic pump and the hydraulic actuator that changes a flow rate of a working fluid supplied from the hydraulic pump to the hydraulic actuator according to a manipulated variable given to a power-operated control element. The control valve is controlled by discharge control means which increases a discharge of the hydraulic pump as the manipulated variable given to the control element is changed so as to increase the supply flow rate of the working fluid. The discharge control means decreases the discharge of the pump corresponding to the manipulated variable as a pressure loaded on the hydraulic actuator or a pressure corresponding to the pressure loaded on the hydraulic actuator increases at least in an operating range where the discharge of the hydraulic pump starts increasing from the minimum discharge.

According to the invention, in the beginning of the control of the control element, the control valve operates in association with the operation to increase the flow rate of the working fluid supplied to the hydraulic actuator. Although the pressure loaded on the actuator temporarily increases, the pump discharge is suppressed as long as the pressure loaded on the actuator is high. Consequently, an abnormal rise in the pressure loaded on the actuator is suppressed and an actual response of the actuator operation in the beginning of the control is slowed. Even when the control element is erroneously suddenly operated, the sudden operation of the actuator in association with the erroneous operation is consequently prevented. The slow beginning of the control facilitates an inching which requires a fine positioning operation. The characteristic that the response is slowed as an actual load of the actuator increases corresponds to the common feeling of the operation for the operators.

Further, the discharge control means can be set so as to decrease the increasing ratio of the discharge of the hydraulic pump for the increase in the manipulated variable given to the control element so as to increase the supply flow rate of the working fluid. In this case, even if the control element is operated through a large stroke, an operational speed of the actuator corresponding to the operation of the control element is suppressed, so that the inching operation can be further facilitated.

The discharge control means can decrease the increasing ratio of the discharge of the hydraulic pump for the increase in the manipulated variable applied to the control element so as to increase the supply flow rate of the working fluid, as the pressure loaded on the hydraulic actuator or the pressure corresponding to the pressure loaded on the hydraulic actuator increases in the operating range where the discharge of the hydraulic pump increases from the minimum discharge and increases the increasing ratio of the discharge of the hydraulic pump for the increase in the manipulated variable applied to the control element, so as to increase the supply flow rate of the working fluid as the pressure loaded on the hydraulic actuator or the pressure corresponding to the pressure loaded on the hydraulic actuator increases in an operating range where the discharge of the hydraulic pump reaches a value just before the maximum discharge. In this case, the discharge of the pump can be changed from the minimum discharge to the maximum discharge in the limited operation range of the control element.

The increasing ratio of the discharge of the hydraulic pump for the increase in the manipulated variable given to the control element so as to increase the supply flow rate of the working fluid can be also decreased as the pressure loaded on the hydraulic actuator or the pressure corresponding to the pressure loaded on the hydraulic actuator increases in the entire operating range in which the discharge of the hydraulic pump is changed from the minimum discharge to the maximum discharge. In this case, since the discharge is controlled in the entire range, it can be controlled more accurately. It is especially suitable for horsepower control.

The discharge control means can fix the values of the minimum discharge, the maximum discharge, and the increasing ratio of the discharge of the hydraulic pump for the increase in the manipulated variable applied to the control element so as to increase the supply flow rate of the working fluid. The discharge control means increases the manipulated variable necessary for the discharge of the hydraulic pump to increase from the minimum discharge as the pressure loaded on the hydraulic actuator or the pressure corresponding to the pressure loaded on the hydraulic actuator increases. In this case, proper pump discharge control can be executed with a simple characteristic setting.

Further, a means which executes an electrical control can be used as a discharge control means. The control valve is constructed by a pilot directional control valve. The discharge control means can comprise means for generating a pilot pressure to the pilot directional control valve corresponding to the manipulated variable applied to the control element and a discharge control valve that receives the pressure loaded on the hydraulic actuator or the pressure corresponding to the pressure loaded on the hydraulic actuator and changes the discharge of the hydraulic pump by reducing the pilot pressure generated from the pilot means as the pressure loaded on the hydraulic actuator or the pressure corresponding to the pressure loaded on the hydraulic actuator increases. The pilot pressure corresponding to the manipulated variable given to the control element is generated to the pilot directional control valve as a control valve, the flow rate of the working fluid supplied to the hydraulic actuator is controlled. The pilot pressure generated from the pilot means is reduced by the discharge control valve and is supplied to the regulator as the pressure loaded on the hydraulic actuator or the pressure corresponding to the pressure loaded on the hydraulic actuator increases, thereby suppressing the discharge of the hydraulic pump.

The discharge control means can also comprise means for generating the pilot pressure corresponding to the manipulated variable applied to the control element and a discharge suppressing regulator. The pilot pressure is led to the pilot directional control valve and the regulator which changes the discharge of the hydraulic pump. The discharge suppressing regulator receives the pressure loaded on the hydraulic actuator or the pressure corresponding to the pressure loaded on the hydraulic actuator and operates the regulator so as to decrease the discharge of the hydraulic pump as the received pressure increases. In this way, the discharge suppressing regulator suppresses the discharge of the hydraulic pump.

The discharge control means can be also constructed in a manner such that a plurality of discharge control modes of different discharges of the hydraulic pump corresponding to the manipulated variables applied to the control element are provided, mode selecting means for selecting an optional discharge control mode among the discharge control modes is provided, and the discharge of the hydraulic pump is controlled in the discharge control mode selected by the mode selecting means. In this case, the operator can obtain the response of the actuator suitable for the contents of the work by selecting the proper discharge control mode among the plurality of discharge control modes. Specifically speaking, when the discharge control mode in which the pump discharge corresponding to the manipulated variable given to the control element is relatively high in the discharge threshold area is selected, a characteristic such that the actuator promptly responds to the control of the control element is obtained, so that a relatively coarse work which requires little fine operability such as a simple loading or unloading work of goods or the like can be quickly executed. On the contrary, when the discharge control mode in which the pump discharge corresponding to the manipulated variable applied to the control element is relatively low in the discharge threshold area is selected, a characteristic such that the operation of the actuator is slow in response to the control of the control element is obtained and a precise work requiring a fine operability, for example, a positioning work of hanged goods, a ground leveling work by an excavator, or the like can be accurately performed.

When the discharge pressure of the hydraulic pump is detected and is taken in the control, even if the variable displacement pump and the control valve mismatch due to a variation in performance of them, the discharge control in which the mismatch is fully compensated can be executed. That is, there are effects such that a generation of an excessive pump discharge due to the mismatch and a generation of a force that causes a spool to flow can be avoided.

DESCRIPTION OF THE PREFERRED EMBODIMENTS

An embodiment of the invention will be described with reference to the drawings.

Figure 1:
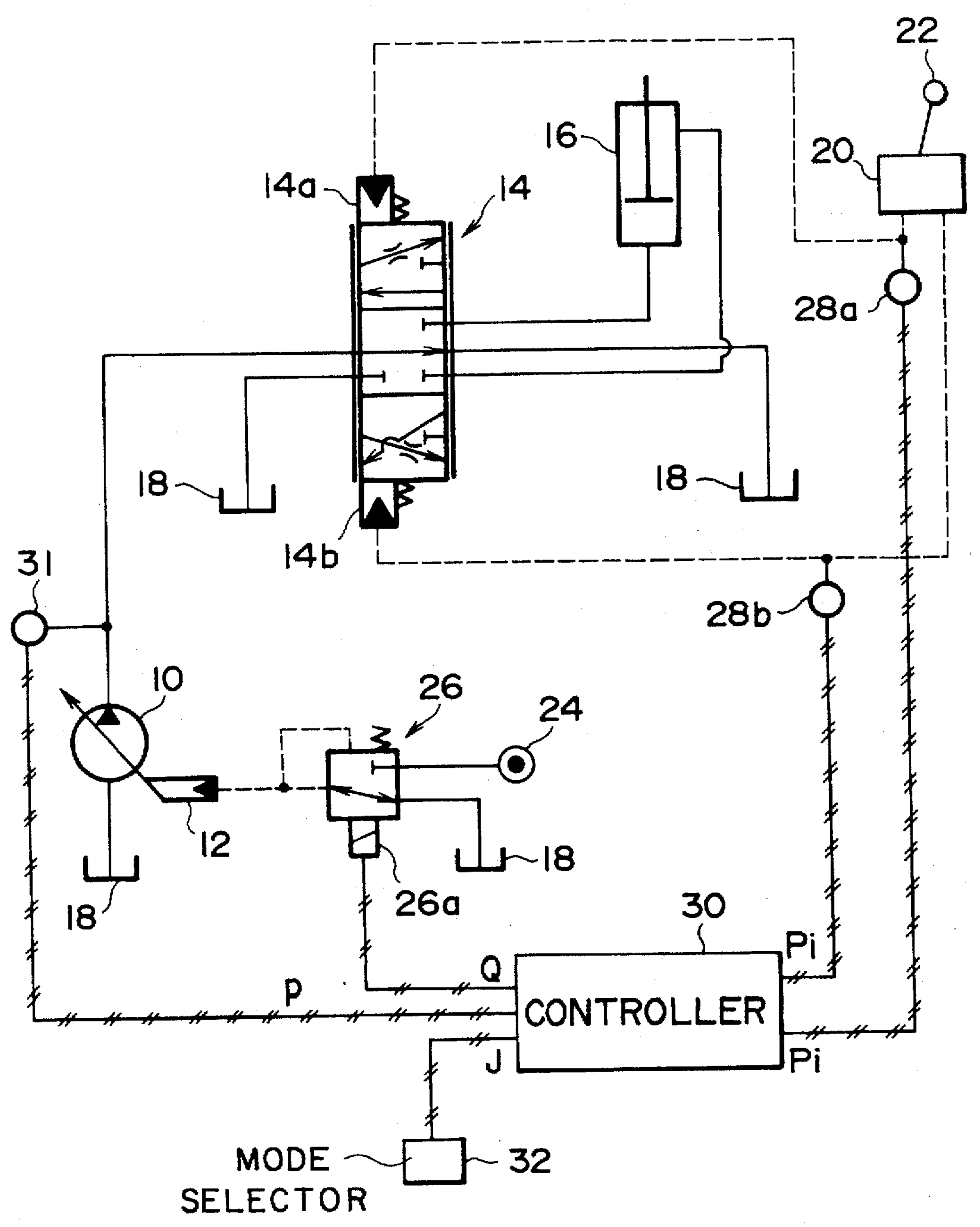
FIG. 1 is a circuit diagram of a hydraulic control system according to an embodiment of the invention.

A system shown in FIG. 1 will be described. The system has a variable displacement hydraulic pump 10. The hydraulic pump 10 is provided with a regulator 12 for changing a discharge (discharge flow) Q of the hydraulic pump 10. A hydraulic cylinder (hydraulic actuator) 16 is connected via a control valve 14 to the hydraulic pump 10.

In addition to the hydraulic cylinder 16, the invention can be also applied to drive circuits of a hydraulic motor and various hydraulic actuators.

The control valve 14 is constructed by a three-position pilot directional control valve in the example of the diagram. The control valve 14 has pilot sections 14*a* and 14*b*. A remote-control pressure (pilot pressure) Pi is appropriately supplied from a remote control valve 20 to the pilot sections 14*a* and 14*b*. The remote control valve 20 supplies the remote-control pressure Pi to the pilot section 14*a* or 14*b* corresponding to a controlled direction and a manipulated variable of a lever (control element) provided in an operation chamber of a work machine. Depending on the sections to which the remote-control pressure Pi is supplied, the control valve 14 operates as follows.

When the remote control pressure Pi is not supplied to the pilot sections 14*a* and 14*b:*

The spool stays in the neutral position and shields the hydraulic cylinder 16 from the hydraulic pump 10, so that the working fluid of the hydraulic pump 10 is center bypassed.

When the remote-control pressure Pi is supplied to the pilot section 14*a:*

The higher the remote-control pressure Pi is, the higher the flow rate of the working fluid of the hydraulic pump 10 to a chamber on the head end of the hydraulic cylinder 16 is. The remaining fluid is center bypassed. The spool operates so that a rod end chamber communicates with a tank 18.

When the remote-control pressure Pi is supplied to the pilot section 14*b:*

The higher the remote-control pressure Pi is, the higher the flow rate of the working fluid of the hydraulic pump 10 to a chamber on the rod end of the hydraulic cylinder 16 is. The remaining fluid is center bypassed. The spool operates so that a head end chamber communicates with a tank 18.

That is, the flow rate of the working fluid supplied from the hydraulic pump 10 to the head end chamber or the rod end chamber of the hydraulic cylinder 16 is successively changed by the operation of the spool of the control valve 14.

The hydraulic pump 10 is provided with a hydraulic source 24 as a means for operating the regulator 12. A solenoid proportional control valve 26 is provided between the hydraulic source 24 and the regulator 12. The solenoid proportional control valve 26 holds a secondary pressure to a pressure proportional to a control signal supplied to a solenoid 26*a*. The regulator 12 changes the discharge of the hydraulic pump 10 according to the secondary pressure of the solenoid proportional control valve 26. Remote-control pressure sensors 28*a* and 28*b* for sensing the remote-control pressure Pi are disposed in a pilot hydraulic line connecting the remote control valve 20 and both of the pilot sections 14*a* and 14*b* of the control valve 14. A discharge pressure sensor 31 for sensing a discharge pressure p is provided on the discharge side of the hydraulic pump 10.

The system is provided with a parameter designator (mode selecting means) 32 for designating a parameter J as an index of the discharge control mode from the outside. The parameter designator 32 has a control unit which is controlled from the outside and generates a value corresponding to the manipulated variable given to the control unit as a parameter J. Output signals of the parameter designator 32 and the sensors 28*a*, 28*b*, and 31 are supplied to a controller 30.

The controller 30 calculates the pump discharge Q on the basis of the following expressions and generates the control signal for obtaining the discharge Q to the solenoid 26*a* of the solenoid proportional control valve 26.

(1) when $0 \leq Pi < Pia$ $Q = Qmin$ (constant)

(2) when $Pia \leq Pi \leq Pib$ $$Q = Qmin + K \times \frac{Qmax - Qmin}{Pib - Pia} \times (Pi - Pia)$$

where, $$K = \left( \frac{P_i - P_{ia}}{P_{ib} - P_{ia}} \right)^{P/J}$$

(3) when $Pi > Pib$ $Q = Qmax$ (constant)

The operation of the system will now be described.

When a lever 22 is operated and the remote-control pressure Pi is supplied from the remote control valve 20 to the pilot section 14*a*, the spool is moved by an amount corresponding to the remote-control pressure Pi. The discharge of the hydraulic pump 10 is supplied to the chamber on the head end of the hydraulic cylinder 16 and a rod of the hydraulic cylinder 16 is pushed out. In this instance, the remote-control pressure Pi and the discharge pressure p of the pump are sensed by the remote-control pressure sensor 28*a* and the discharge pressure sensor 31, respectively, and the sensed values are supplied to a controller 30. The controller 30 calculates a desired discharge Q of the pump on the basis of the remote-control pressure Pi and supplies a control signal to the solenoid 26*a* of the solenoid proportional control valve 26 so that the desired pump discharge Q can be obtained.

Figure 2A:
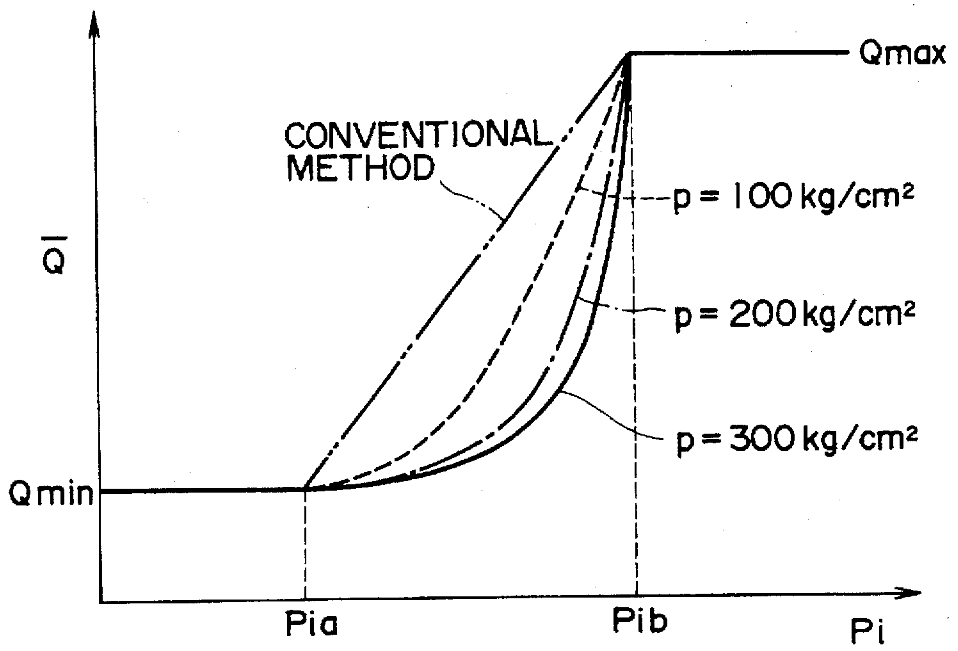
FIGS. 2*a* and 2*b* are graphs each showing a remote-control pressure-pump discharge characteristic which is set in the hydraulic control system.
Figure 2B:
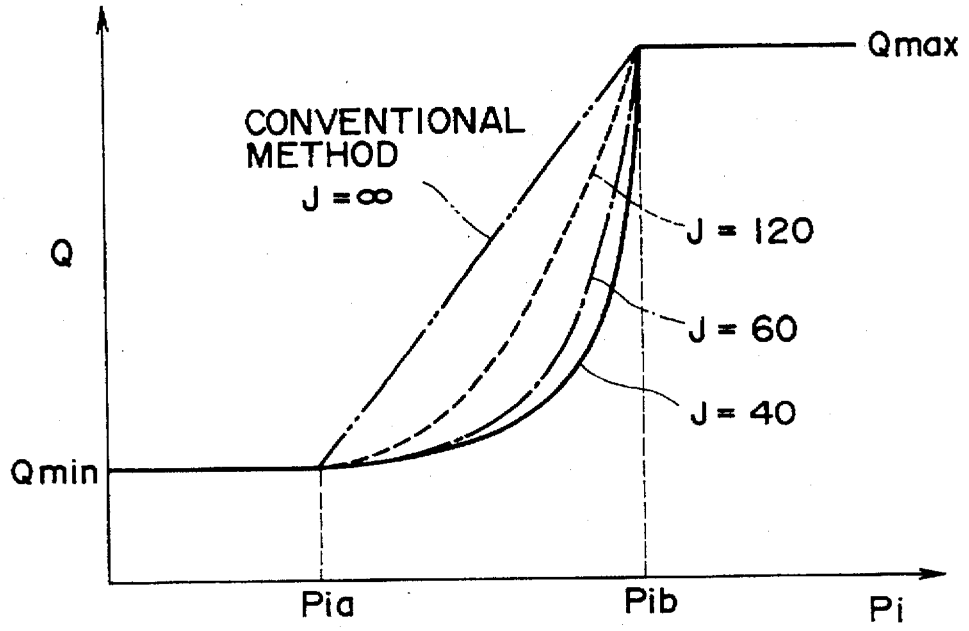

Specifically speaking, the pump discharge Q is maintained to a minimum discharge (stand-by discharge) Qmin irrespective of the manipulated variable in a lever fine operating range until the remote-control pressure Pi reaches the pressure Pia shown in FIGS. 2*a* and 2*b*. The discharge Q of the pump is increased according to the manipulated variable of the lever after a time point when the remote-control pressure Pi exceeds the pressure Pia.

Conventionally, as shown by alternate long and two short dashes lines in FIGS. 2*a* and 2*b*, the discharge Q of the pump is increased in proportion to the increased amount of the remote-control pressure Pi irrespective of the pump discharge pressure p. On the other hand, according to the embodiment, as it is obvious from the above expressions, the increasing rate of the discharge Q of the pump (hereinlater, simply referred to as a "discharge increasing rate") for the increase in the remote-control pressure Pi is suppressed in an area just after the discharge Q of the pump is increased (that is, an area where the remote-control pressure Pi is near the pressure Pia, hereinlater, simply referred to as a "threshold area"). On the contrary, the increasing rate of the discharge is increased in an operating range in which the discharge Q of the pump reaches a value just before the maximum discharge Qmax (that is, an area where the remote-control pressure Pi is near the pressure Pib, hereinlater, referred to as a "convergent area"). Namely, when the parameter J is set to be constant, the remote-control pressure-pump discharge characteristic draws a downward convex curve shown in FIG. 2*a* in an area in which the remote-control pressure Pi lies between Pia and Pib. The higher the pump discharge pressure p is, the more the discharge increasing rate in the threshold area is suppressed and the discharge increasing rate is increased in the convergent area.

According to the embodiment, the following effects can be obtained.

Figure 3A:
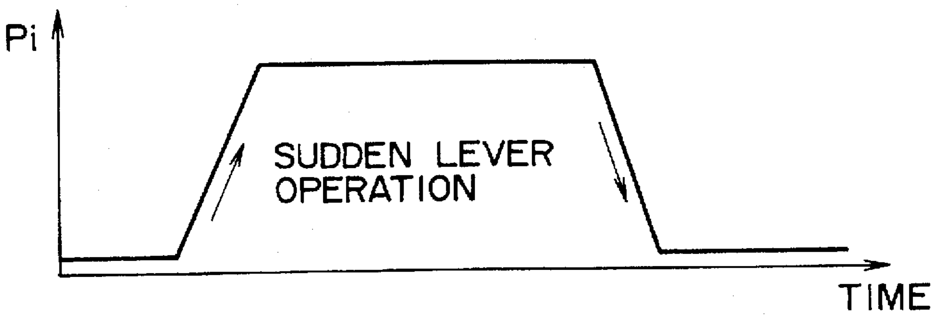
FIG. 3a PRIOR ART
FIG. 3*a* is a graph showing an example of a variation in a remote-control pressure Pi with time in a conventional hydraulic control system.
Figure 3B:
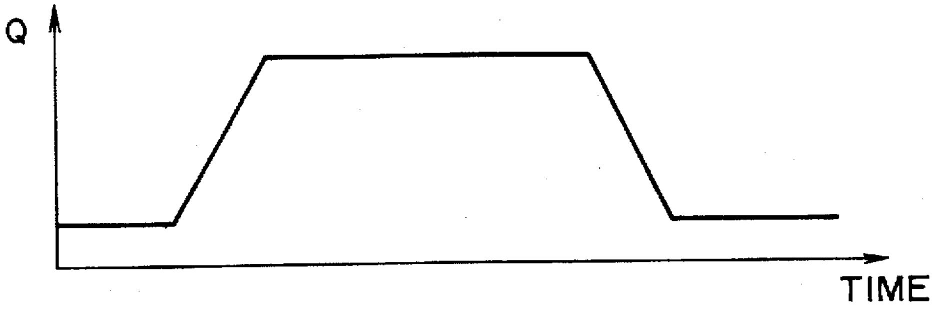
FIG. 3b PRIOR ART
FIG. 3*b* is a graph showing a variation in a pump discharge Q corresponding to a change in the remote-control pressure Pi with time.
Figure 3C:
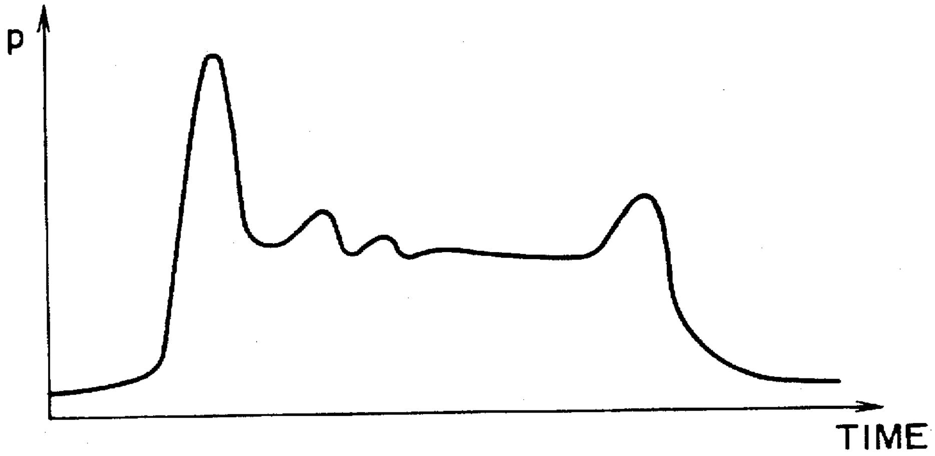
FIG. 3c PRIOR ART
FIG. 3*c* is a graph showing a variation in a discharge pressure p of the pump with time for the remote-control pressure Pi and the pump discharge Q.
Figure 4A:
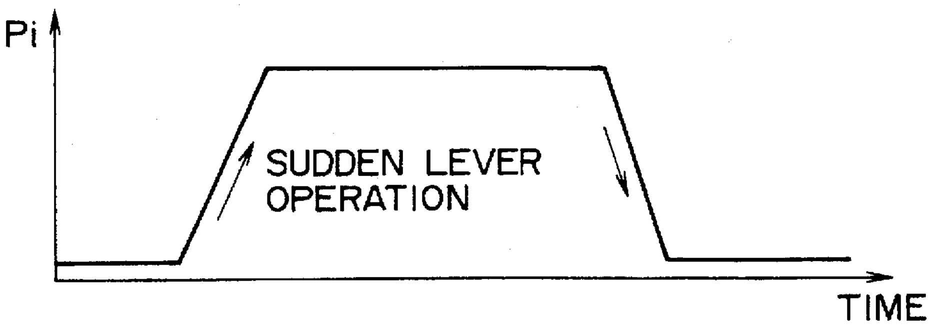
FIG. 4*a* is a graph showing an example of a variation of the remote-control pressure Pi with time in the hydraulic control system of the embodiment.
Figure 4B:
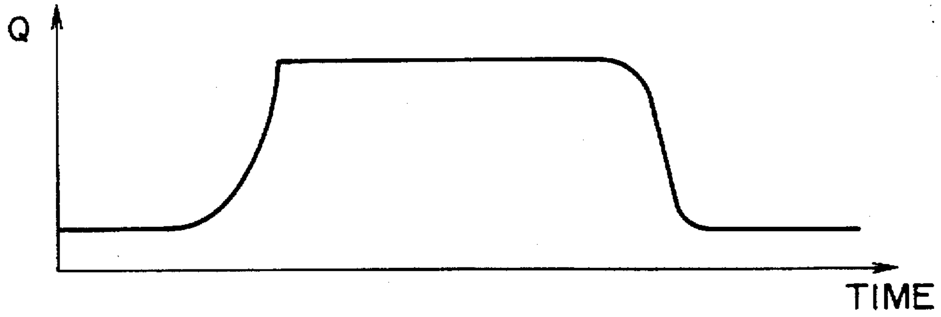
FIG. 4*b* is a graph showing a variation in the pump discharge Q corresponding to a change in the remote-control pressure Pi with time.
Figure 4C:
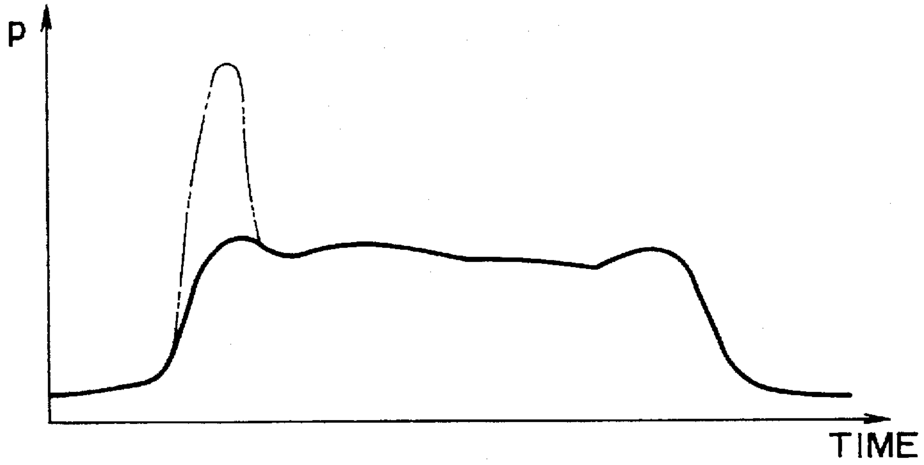
FIG. 4*c* is a graph showing a variation of a discharge pressure p of the pump with time in association with the remote-control pressure Pi and the pump discharge Q.

(a) In the conventional positive control system, when the lever 22 is suddenly operated and the remote-control pressure Pi is rapidly increased as shown in FIG. 3*a*, the discharge Q of the pump follows it and is also increased as shown in FIG. 3*b*. Consequently, the pump discharge pressure p suddenly rises as shown in FIG. 3*c* and there is the possibility that an activation shock is caused. According to the embodiment, however, when the remote-control pressure Pi is suddenly increased as shown in FIG. 4*a* an increase in the pump discharge pressure p in association with the increase in the remote-control pressure Pi is quickly detected and the increase in the pump discharge Q is suppressed as shown in FIG. 4*b*. As a result, the sudden increase in the pump discharge pressure p is avoided as shown in FIG. 4*c*, so that the hydraulic equipment is protected from the activation shock.

(b) Since the discharge increasing rate is suppressed in the threshold area, the operational speed of the hydraulic cylinder 16 in association with the operation of the lever 22 is low in this area. Therefore, it is suitable for performing an inching operation which requires a precise positioning work or the like.

(c) Although the manipulated variable of the lever 22 is the same, as the actual load of the hydraulic cylinder 16 increases (that is, the pump discharge pressure p increases), the pump discharge Q is suppressed. Consequently, a response corresponding to the operator's common feeling such that "as the actuator load increases, the response of the actuator is slowed, so that it is necessary to operate the lever through a large stroke". The operator can operate the lever 22 very naturally although the positive control is basically executed.

(d) As shown in FIG. 2*b*, the smaller the parameter J in the expressions is designated, the more the pump discharge Q is suppressed in the area where the remote-control pressure Pi lies in the range from Pia to Pib and the increasing rate of the discharge in the threshold area is also suppressed. Thus, when the operator only designates the parameter J, the response suitable for the contents of the work can be realized by a single system. For example, when a relatively large value is designated as a parameter J, a characteristic such that the hydraulic cylinder 16 promptly responds to the operation of the lever 22 is obtained. Relatively coarse works which hardly require the fine operability, for example, simple loading and unloading works of goods and the like can be efficiently executed, On the contrary, when a relatively small value is designated as a parameter J, a characteristic such that the hydraulic cylinder 16 slowly responds to the operation of the lever 22 is obtained. Further, a precise work requiring the fine operability, for example, a positioning work of hanged goods, a work of leveling the ground by an excavator, or the like can be accurately performed.

SIMULATION RESULTS

Figure 5A:
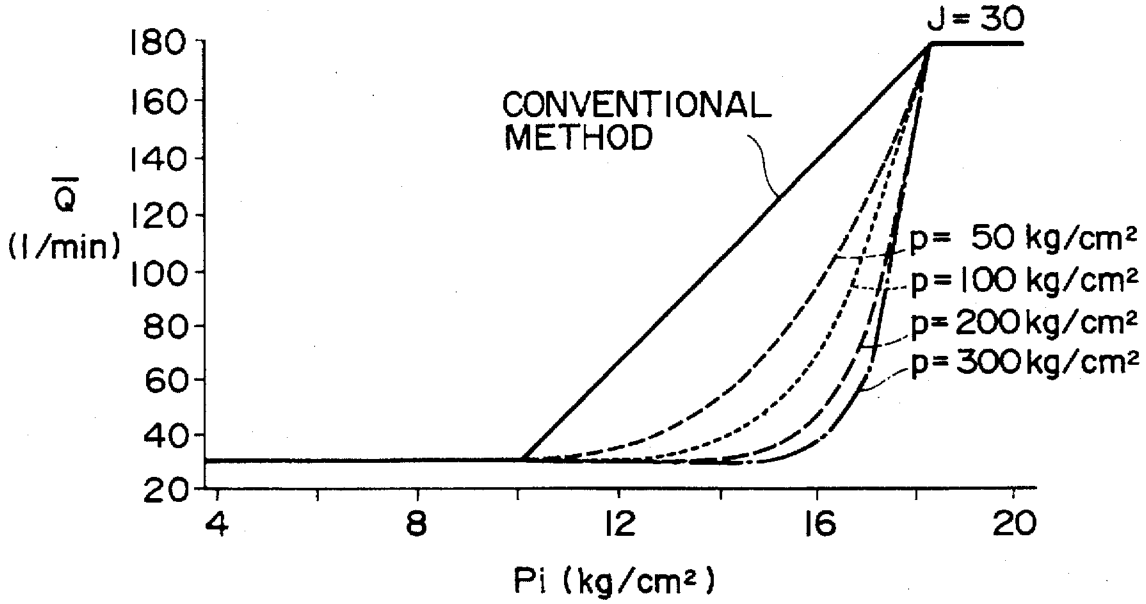
FIGS. 5*a* and 5*b* are graphs each showing a remote-control pressure-pump discharge characteristic obtained by a simulation with respect to the system of the embodiment.
Figure 5B:
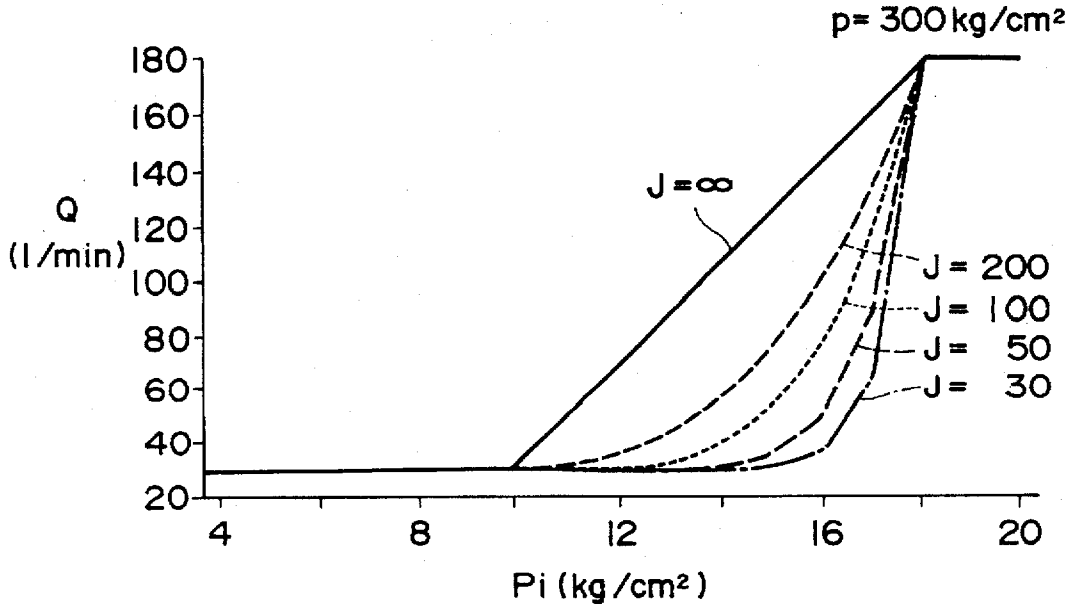

FIG. 5*a* shows a result obtained by a simulation of the relation between the remote-control pressure Pi and the pump discharge Q when the pump discharge pressure p is set to various values on the condition that the parameter J is constant (=30). FIG. 5*b* shows a result obtained by a simulation of the relation between the remote-control pressure Pi and the pump discharge Q when the parameter J is set to various values on the condition that the pump pressure p is constant (=300 kg/cm2). It will be understood from the graphs that the pump discharge Q is suppressed in the middle area and, the higher the pump discharge pressure p is, or the smaller the parameter J is, the more remarkable the degree of the suppression of the discharge Q is.

Figure 6:
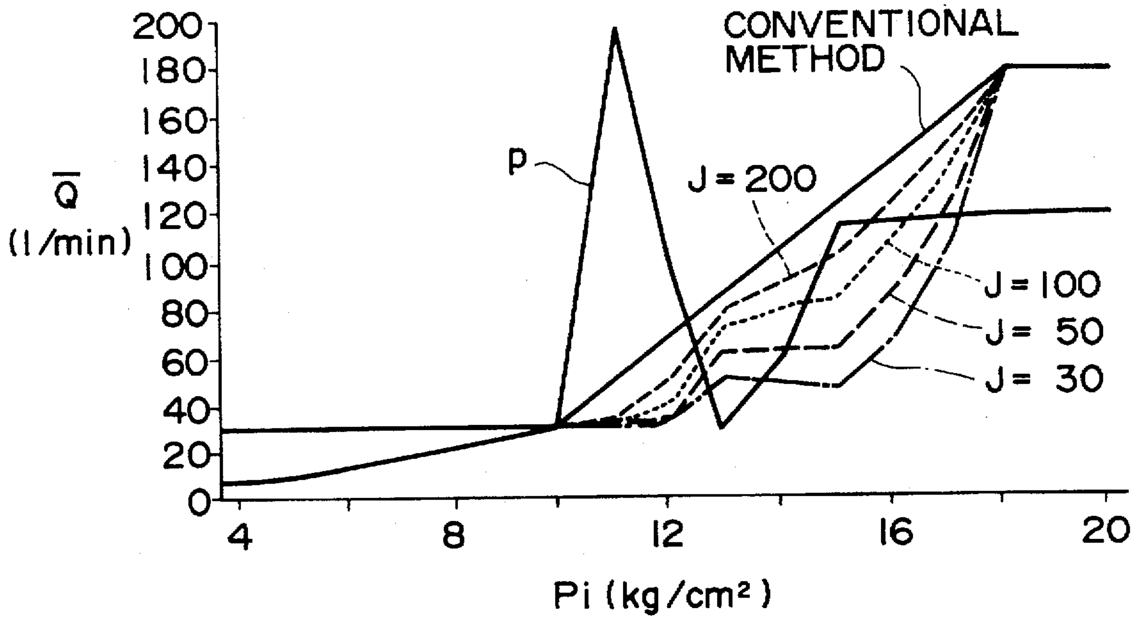
FIG. 6 is a graph showing a remote-control pressure-pump discharge characteristic obtained by a simulation with respect to the system of the embodiment.

FIG. 6 shows results obtained by a simulation of a change in the pump discharge pressure p and a change in the pump discharge Q (J=30, 50, 100, 200) in association with the change of the pump discharge pressure p when the remote-control pressure Pi is gradually increased. As will be understood from the graph, although the pump discharge pressure p once increases in the threshold area, the increase in the pump discharge Q is suppressed by detecting the increase in the discharge pressure. From a time point when the pump discharge pressure p is decreased, the pump discharge Q starts to regularly increase. It means that the activation shock due to an abnormal rise in the pump discharge pressure p and the sudden operation of the actuator can be prevented.

The invention is not limited to the above embodiment but the following embodiments are also possible.

(1) A volume switch which can continuously adjust the parameter J, or the like can be also used as the parameter designator 32. Something like a change-over switch for selecting the parameter J among limited values can be also used. In case of the former one, the discharge control mode can be selected among an infinite number of modes. The mode selecting means in the invention can be constructed by a memory card into which data selected by the operator has preliminarily been stored and means for reading it and transmitting it to an instructing device.

Figure 7A:
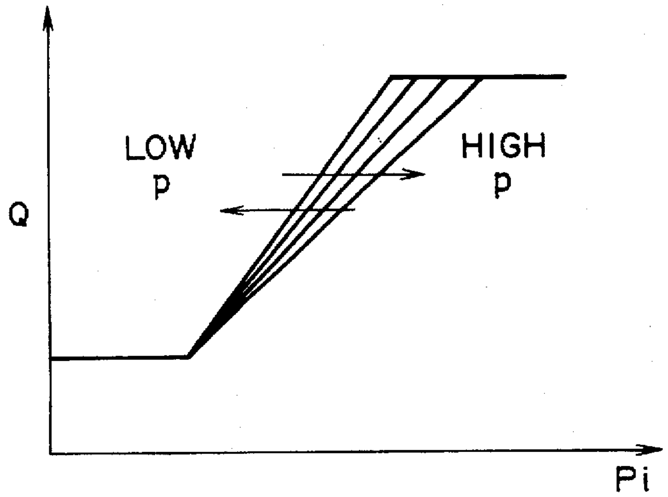
FIGS. 7*a*, 7*b* and 7*c* are graphs each showing a modified embodiment of the remote-control pressure-pump discharge characteristic.
Figure 7B:
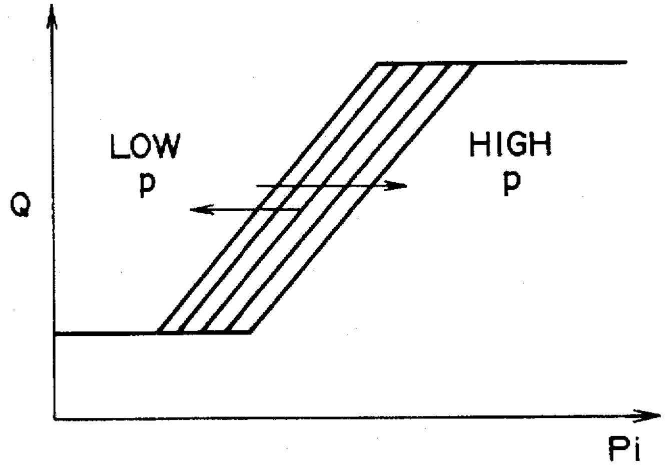
Figure 7C:
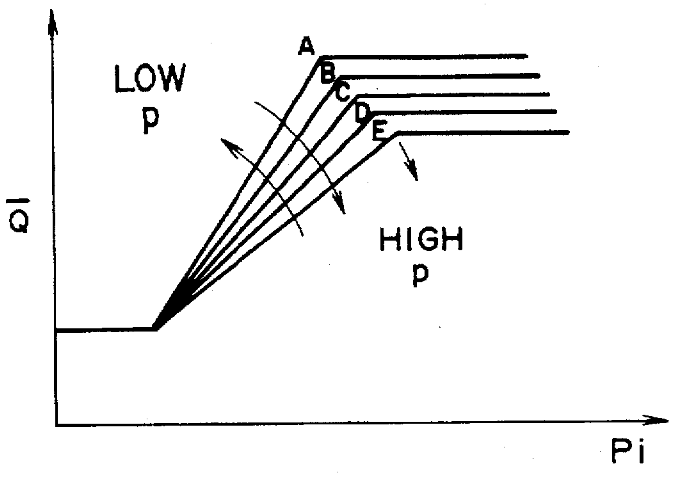

(2) Although the Pi-Q characteristic draws a curve in the embodiment, the characteristic can also draw a straight line. In this case as well, the effects of the invention can be obtained by decreasing the pump discharge Q as the pump discharge pressure p increases. For example, as shown in FIG. 7*a*, it is also possible to set in a manner such that each of the threshold of the pump discharge Q and the maximum discharge is set to be constant and the increasing rate of the discharge is decreased in association with the increase in the pump discharge pressure p. As shown in FIG. 7*b*, it is also possible to set in a manner such that each of the minimum discharge, the maximum discharge, and the increasing rate is set to be constant and only the timing of the increase in the pump discharge Q is delayed in association with the rise in the pump discharge pressure p. In case of combining with using a horsepower control, as shown in FIG. 7*c*, both of the increasing rate of the discharge and the maximum discharge are decreased as the pump discharge pressure p increases.

In s manner similar to the setting of the above expression, when the increasing rate of the discharge in the threshold area is suppressed as the pump discharge pressure p increases and contrarily the increasing rate of the discharge is increased in the convergent area, the pump discharge Q can be increased from the minimum discharge Qmin to the maximum discharge Qmax through a limited lever stroke corresponding to the remote control pressures Pia to Pib. There is, consequently, an advantage such that both of the inching performance and the high speed working performance can be improved.

(3) As means for obtaining the pump discharge Q by the controller 30, the pump discharge Q can be calculated by using the above expressions as they are on the basis of the pump discharge pressure p and the parameter J. The pump discharge Q can be also calculated in a manner such that a table as shown by the following table 1 of coefficients K corresponding to the pump discharge p and the remote-control pressure Pi with respect to the set parameters J is preliminarily stored in the controller 30, a value of K corresponding to the parameter J and the pump discharge p is actually selected from the table, and the pump discharge Q is calculated on the basis of the selected value.

TABLE 1

| | | | | | | | | J = OO |
|---|---|---|---|---|---|---|---|---|
| | | Pi | | | | | | |
| | | 0 | 1 | 2 | 3 | . . . | 24 | 25 |
| p | 0 | | | | | | | |
| | 10 | | | | | | | |
| | 20 | | | | | | | |
| | 30 | | | | | | | |
| | . | | | | | K | | |
| | . | | | | | | | |
| | 290 | | | | | | | |
| | 300 | | | | | | | |

(4) In the case where the usage of a machine to which the hydraulic control system of the invention is assembled is limited to a narrow range, a variable is not used but a constant can be used as the parameter J. That is, the discharge control mode can be fixed.

(5) In the invention, it is sufficient to execute the discharge control on the basis of the pressure corresponding to the pressure loaded on the actuator. For example, the pump discharge Q can be set on the basis of an inlet pressure of the actuator or the like in place of the pump discharge pressure p. When the discharge control is executed on the basis of the pump discharge pressure p as mentioned above, even when the hydraulic pump 10 and the control valve 14 are mismatched due to the variation in performances of the hydraulic pump 10 and the control valve 14, the mismatch can be fully compensated. The generation of the excessive pump discharge pressure due to the above mismatch and the generation of the force that causes the spool to flow can be consequently avoided.

(6) Although the remote control pressure Pi of the remote control valve 20 is supplied as a pilot pressure to the control valve 14 in the foregoing embodiment, for example, it is also possible to electrically directly detect the manipulated variable given to the control element such as the lever 22 by an encoder or the like and to electrically control the operation of the control valve 14 on the basis of the manipulated variable.

Figure 8A:
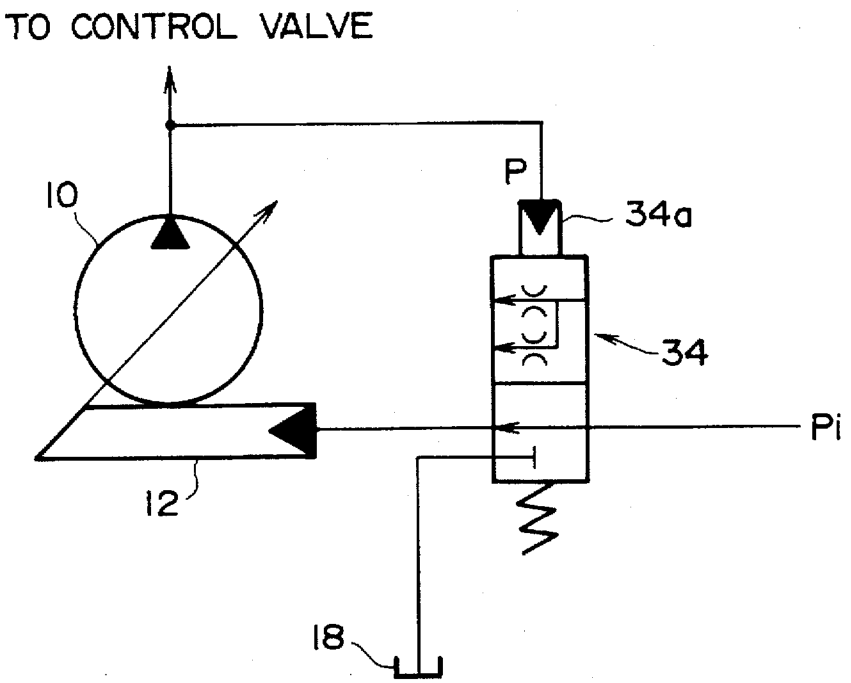
FIGS. 8*a* and 8*b* are circuit diagrams showing an example such that the pump discharge is hydraulically controlled.
Figure 8B:
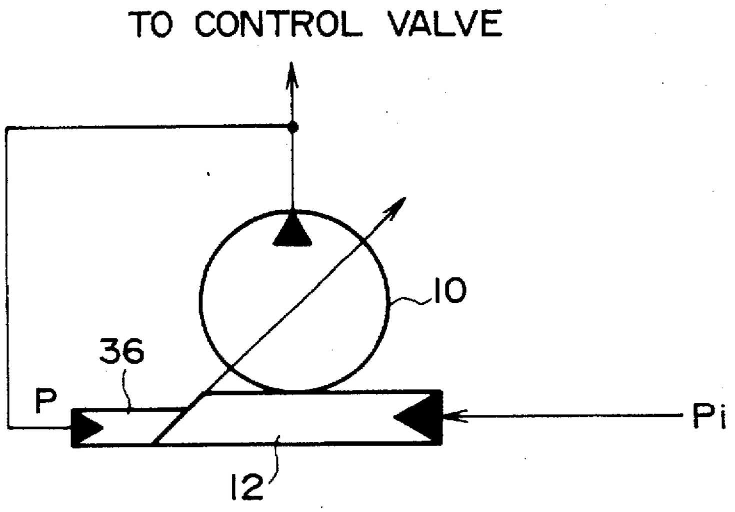
Figure 9:
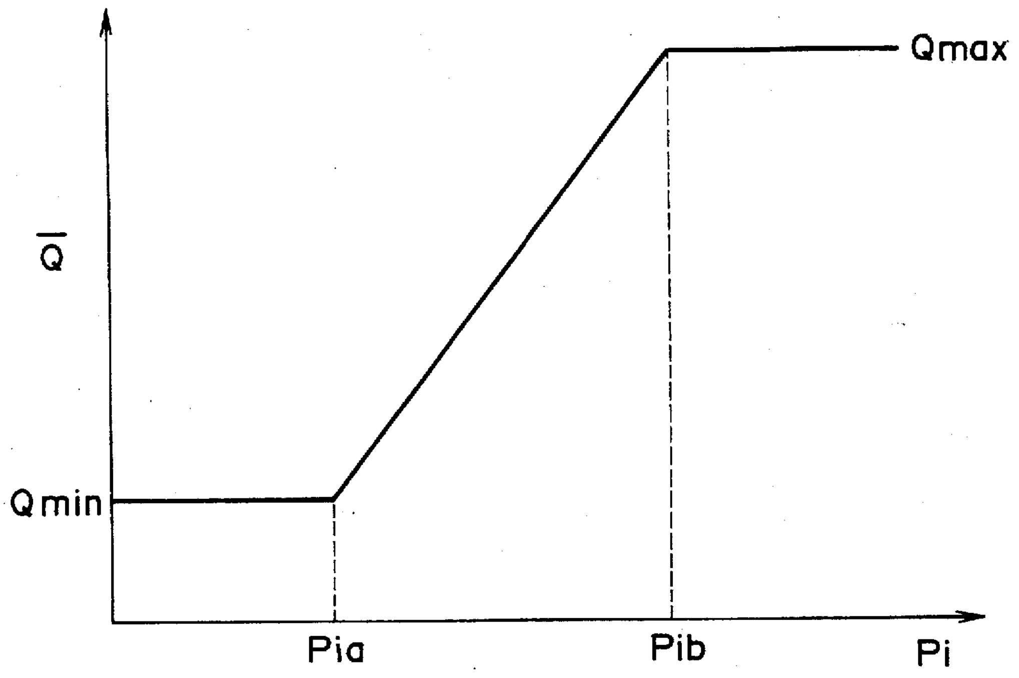
FIG. 9 PRIOR ART
FIG. 9 is a graph showing an example of a remote-control pressure-pump discharge characteristic set in a conventional positive control system.

(7) The pump discharge can be also controlled by a simple construction using only hydraulic means without using electric means in the invention. For example, as shown in FIG. 8*a*, a proper pump discharge control can be executed by constructing the discharge control valve 34 in a manner such that the remote control pressure Pi is led via a discharge control valve 34 comprising a pilot directional control valve to the regulator 12 and the discharge pressure p of the hydraulic pump 10 is led to a pilot section 34*a* of the discharge control valve 34 and as the discharge pressure p increases, the ratio of leading the working fluid which flows into the regulator 12 to the tank 18 is increased, thereby decreasing the supply pressure to the regulator 12. As shown in FIG. 8*b*, a pump discharge control similar to the above can be also realized by constructing the discharge suppressing regulator 36 in a manner such that a discharge suppressing regulator 36 is provided on the opposite side of the regulator 12, the pump discharge pressure p is introduced to the discharge suppressing regulator 36, and as the pump discharge pressure p increases, the regulator 12 is operated so as to decrease the pump discharge.

I claim:

1. A hydraulic control system comprising:

a variable displacement hydraulic pump for pumping a working fluid;

a hydraulic actuator;

a line connecting said hydraulic actuator to said hydraulic pump such that said hydraulic actuator receives the working fluid from said hydraulic pump;

a control valve provided in said line for changing a flow rate of the working fluid;

a control element which controls said control valve according to a manipulated variable; and discharge control means for controlling a working fluid discharge quantity of said hydraulic pump such that:

a) the discharge quantity increases for increases of the manipulated variable beyond a threshold level of the manipulated variable, and b) a ratio of increase of the discharge quantity to increase of the manipulated variable adjacent the threshold level is smaller for larger discharge pressures in said line at a position between said pump and said control valve and is larger for smaller discharge pressures in said line at said position between said pump and said control valve.

2. A hydraulic control system according to claim 1, wherein said discharge control means decreases the increasing rate of the discharge quantity of said variable-displacement hydraulic pump corresponding to the increase in the manipulated variable so as to increase the supply flow rate of the working fluid as the discharge pressure increases at least in the operating range where the discharge quantity of said variable-displacement hydraulic pump increases from a minimum discharge quantity level and, increases the increasing rate of the discharge of said variable-displacement hydraulic pump corresponding to the increase in the manipulated variable so as to increase the supply flow rate of the working fluid as the discharge pressure increases in an operating range where the discharge of said variable-displacement hydraulic pump reaches a value just before a maximum discharge quantity level.

3. A hydraulic control system according to claim 1, wherein said discharge control means calculates a desired pump discharge Q on the basis of the following equation according to the discharge pressure where the discharge quantity of said variable-displacement hydraulic pump changes from a minimum discharge quantity level to a maximum discharge quantity level, $$Q = Q\min + K \times \frac{Q\max - Q\min}{Xib - Xia} \times (Xi - Xia)$$

where, $$K = \left( \frac{Xi - Xia}{Xib - Xia} \right)^{P/J}$$

Qmin: minimum pump discharge

Qmax: maximum pump discharge

Xi: present manipulated variable or variable corresponding to the present manipulated variable Xia: manipulated variable or variable corresponding to the manipulated variable when the pump discharge is increased from the minimum discharge Xib: manipulated variable or variable corresponding to the manipulated variable when the pump discharge reaches the maximum discharge J: constant.

4. The hydraulic control system of claim 1 wherein said discharge control means further controls the working fluid discharge quantity of said hydraulic pump such that a ratio of increase of the discharge quantity to increase of the manipulated variable adjacent a maximum discharge quantity level is larger for larger discharge pressures in said line at said position between said pump and said control valve and is smaller for smaller discharge pressures in said line at said position between said pump and said control valve.

5. The hydraulic control system of claim 1 wherein said control valve is a pilot pressure operated directional control valve, including means for generating a pilot pressure corresponding to the manipulated variable.

6. A hydraulic control system according to claim 5, further comprising a regulator for changing the discharge quantity of said variable-displacement hydraulic pump and a discharge suppressing regulator that receives the discharge pressure and operates the regulator so as to reduce the discharge quantity of said variable-displacement hydraulic pump as the quantity pressure increases.

7. A hydraulic control system according to claim 1, further comprising mode selecting means for selecting an optional discharge control mode among a plurality of discharge control modes in which the discharge quantity given to said variable-displacement hydraulic pump corresponding to the manipulated variable are different, wherein said discharge control means controls the discharge quantity of said variable-displacement hydraulic pump in the discharge control mode selected by said mode selecting means.

8. A hydraulic control system according to claim 7, wherein said discharge control means calculates a desired pump discharge Q on the basis of the following equation according to the discharge pressure where the discharge quantity of said variable-displacement hydraulic pump changes from a minimum discharge quantity level to a maximum discharge quantity level and said mode selecting means designates a parameter J of the following equation.

$$Q = Q\text{min} + K \times \frac{Q\text{max} - Q\text{min}}{Xib - Xia} \times (Xi - Xia)$$

where, $$K = \left( \frac{Xi - Xia}{Xib - Xia} \right)^{P/J}$$

Qmin: minimum pump discharge

Qmax: maximum pump discharge

Xi: present manipulated variable or variable corresponding to the present manipulated variable Xia: manipulated variable or variable corresponding to the manipulated variable when the pump discharge is increased from the minimum discharge Xib: manipulated variable or variable corresponding to the manipulated variable when the pump discharge reaches the maximum discharge.

* * * * *